United States Patent
Wessel

(10) Patent No.: US 10,050,428 B2
(45) Date of Patent: Aug. 14, 2018

(54) CORD MANAGEMENT CLIP

(71) Applicant: Elmer A. Wessel, Lincoln, NE (US)

(72) Inventor: Elmer A. Wessel, Lincoln, NE (US)

( * ) Notice: Subject to any disclaimer, the term of this patent is extended or adjusted under 35 U.S.C. 154(b) by 0 days.

(21) Appl. No.: 14/920,091

(22) Filed: Oct. 22, 2015

(65) Prior Publication Data

US 2016/0116084 A1 Apr. 28, 2016

Related U.S. Application Data

(60) Provisional application No. 62/067,726, filed on Oct. 23, 2014.

(51) Int. Cl.
*F16L 3/08* (2006.01)
*H02G 3/32* (2006.01)

(52) U.S. Cl.
CPC ..................................... *H02G 3/32* (2013.01)

(58) Field of Classification Search
CPC .............. F16L 3/10; F16L 3/08; B60P 7/0823
See application file for complete search history.

(56) References Cited

U.S. PATENT DOCUMENTS

| | | | | |
|---|---|---|---|---|
| 5,058,838 A | * | 10/1991 | Velke, Sr. | F21V 19/009 174/138 H |
| 5,524,327 A | * | 6/1996 | Mickel | F16L 3/00 24/115 A |
| D454,776 S | * | 3/2002 | Padrun | D8/354 |
| 6,557,317 B2 | * | 5/2003 | Sorkin | E04C 5/20 404/135 |
| D477,770 S | * | 7/2003 | Baker | D8/373 |
| 2008/0118304 A1 | * | 5/2008 | Carraher | B25H 3/04 403/396 |

* cited by examiner

*Primary Examiner* — Amy J. Sterling
(74) *Attorney, Agent, or Firm* — Geoffrey E. Dobbin; Dobbin IP Law P.C.

(57) ABSTRACT

A clip is used to manage cords. The clip features a containment sleeve with a portion thereof being open, thereby forming a gap for passage into the sleeve, and extending outward as two opposing flanges. A cord is passed through the gap so as to reside in the sleeve and the flanges are used to interface with a rigid wire found in the environment of the cord. The clip has particular use in wire-constructed merchandizers and other such structures and for managing cords to provide power for lighting and other display enhancement devices.

1 Claim, 6 Drawing Sheets

US 10,050,428 B2

CORD MANAGEMENT CLIP

FIELD OF THE INVENTION

The present invention relates to the field of cable management and more particularly relates to a clip useful in securing cords and cables to a wire frame, or similar, structure.

BACKGROUND OF THE INVENTION

Currently, the most efficient manner by which power may be conducted from a power source to a device is the use of an electrically conductive cord or cable (the term "cord" will be considered to include "cables" throughout this specification and the appended claims) which connects one to the other. Usually, the cord is permanently affixed to the device and drawn to the nearest power outlet and plugged into said outlet. This activity gives rise of a need to manage the position of those cords in a way to, among many reasons, prevent chaos, accidents, and to manage the aesthetics of a presentation. Many devices have been developed over many years to answer this need in many different ways and with many different strategies, each depending upon the field of use, desired treatment of the cord and other factors.

One scenario is where cord must be hidden for aesthetic reasons and also for safety. Again, the control of such a cord would be dependent upon the environment in which it is used as available structure could be an anchor for the cord. The use of cords on wire racks, in particular product merchandizers, is relatively new. Applications have been filed by this inventor for methods and apparatuses to provide lighting to the display racks of such merchandizers and these applications require that a cord be threaded from a lighting device to a power source. Since the merchandizers are usually a rigid wire construction, clipping cords to the wire of merchandizer shelves would be an efficient method of managing their positions. Such attachment means needs to be efficient and intuitive to operate while also being low cost to manufacture. It should also be removable in a similarly efficient manner. The present invention is a clip which holds a cord in one section while connecting to a merchandizer wire, such as a part of a rack, with two flanges.

The present invention represents a departure from the prior art in that the clip of the present invention allows for quick and efficient attachment of cords to the wire components of merchandizer racks as well as the efficient removal therefrom.

SUMMARY OF THE INVENTION

In view of the foregoing disadvantages inherent in the known types of cord management devices, this invention provides a clip for attaching a cord to a wire component of a merchandizer rack. As such, the present invention's general purpose is to provide a new and improved cord management clip that is easily attached and removed from a wire component of such racks and other similarly made structures.

To accomplish these objectives, the clip comprises a cylindrical containment sleeve with one side opening to two opposing flanges. The flanges are spaced apart such that a wire from a merchandizer or similar structure can be orthogonally positioned between the flanges. Once in this position, the clip is twisted such that the opposing flanges interface with the wire. For removal, the clip is merely twisted in an opposite direction to disengage the flanges.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

With reference now to the drawings, the preferred embodiment of the cord management clip is herein described. It should be noted that the articles "a", "an", and "the", as used in this specification, include plural referents unless the content clearly dictates otherwise.

Figure 1:
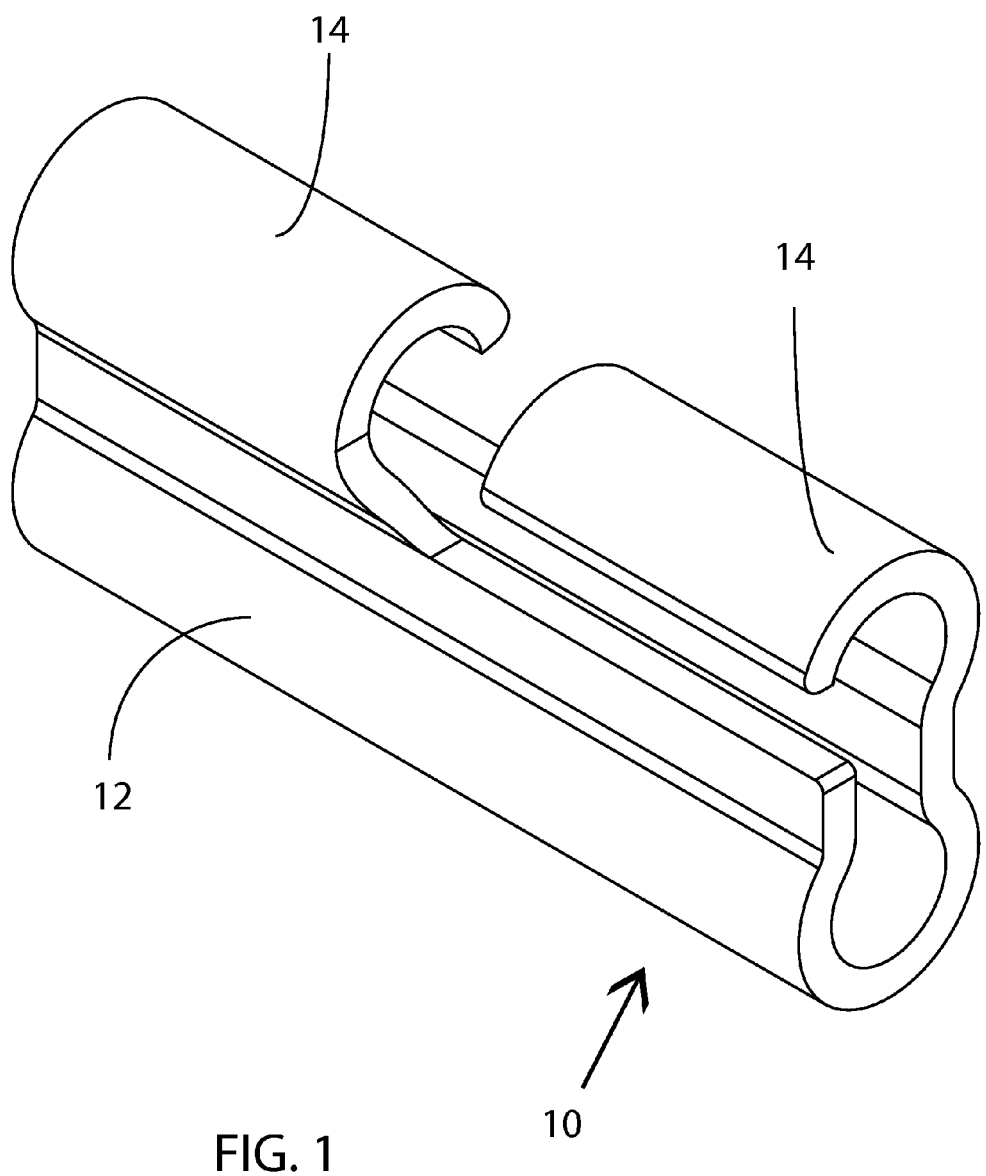
FIG. 1 is a perspective view of a clip made in accordance to the teachings of the present invention.
Figure 2:
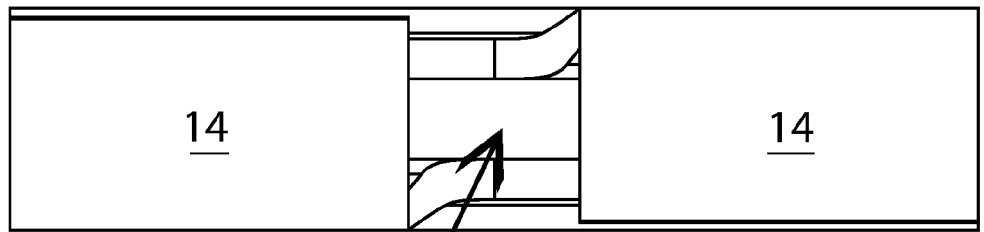
FIG. 2 is a top plan view of the clip of FIG. 1.
Figure 3:
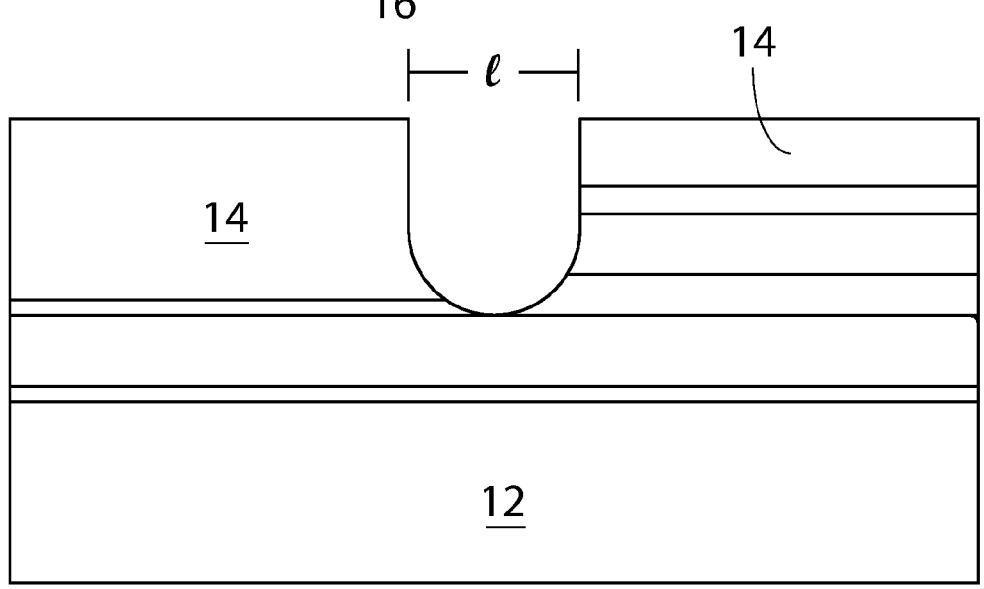
FIG. 3 is a side elevation of the clip of FIG. 1.
Figure 4:
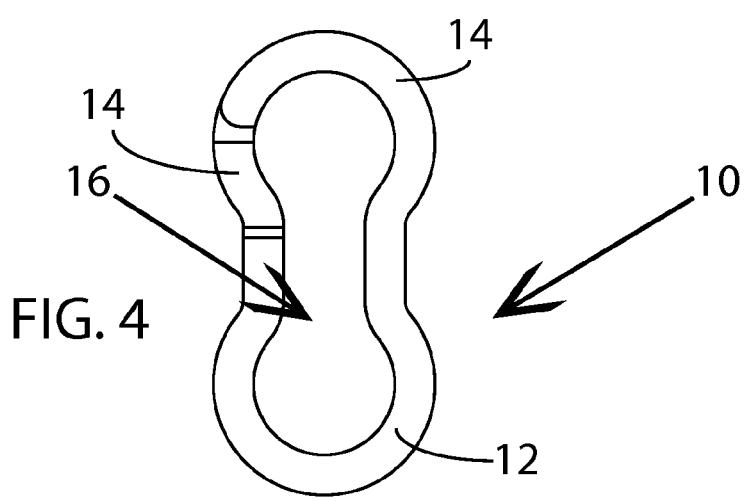
FIG. 4 is a front elevation of the clip of FIG. 1.
Figure 5:
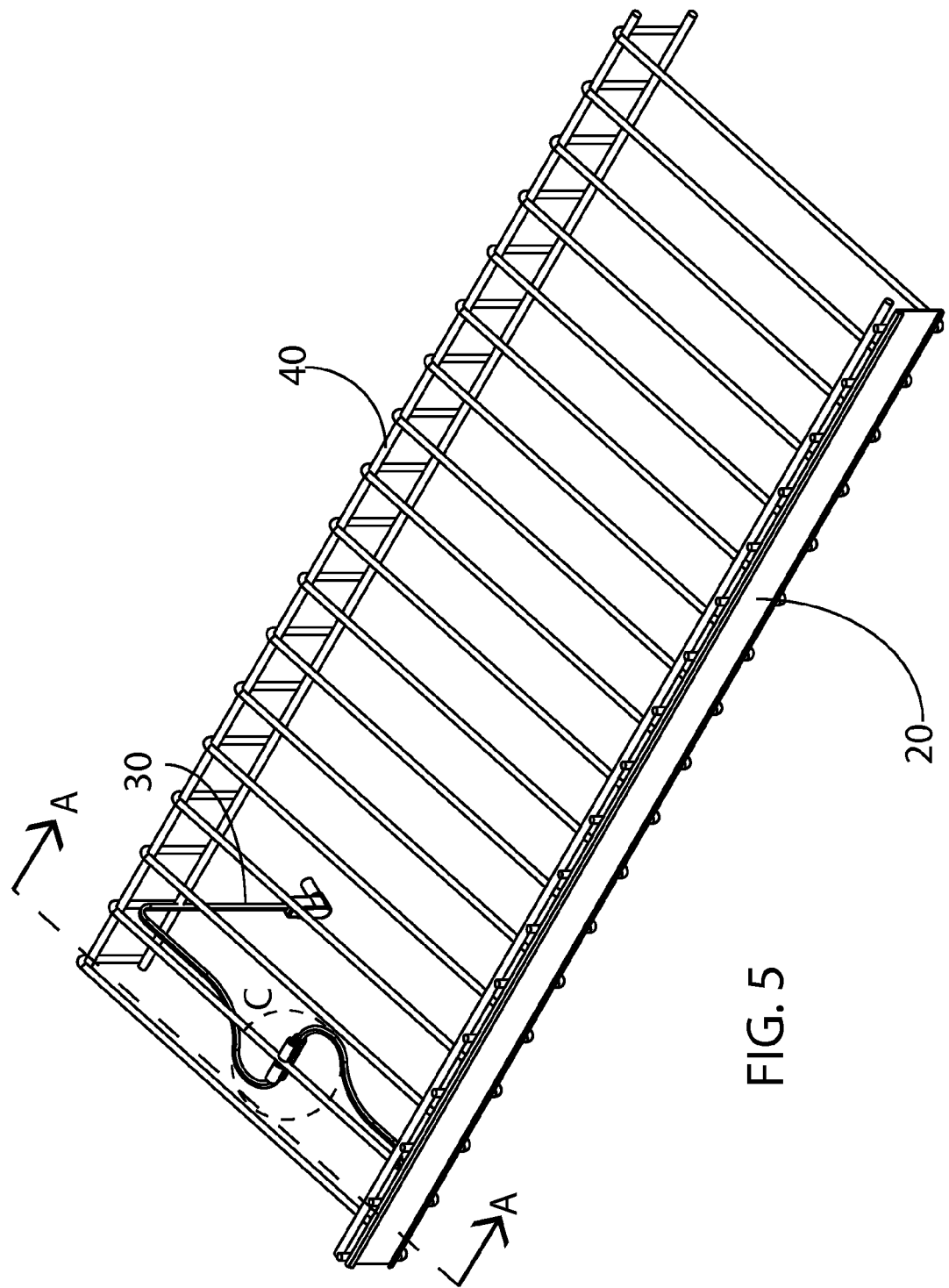
FIG. 5 is a perspective view of a wire merchandizer rack and lighting unit, with a clip of FIG. 1 being used to control the lighting unit's cord, before installation.
Figure 6:
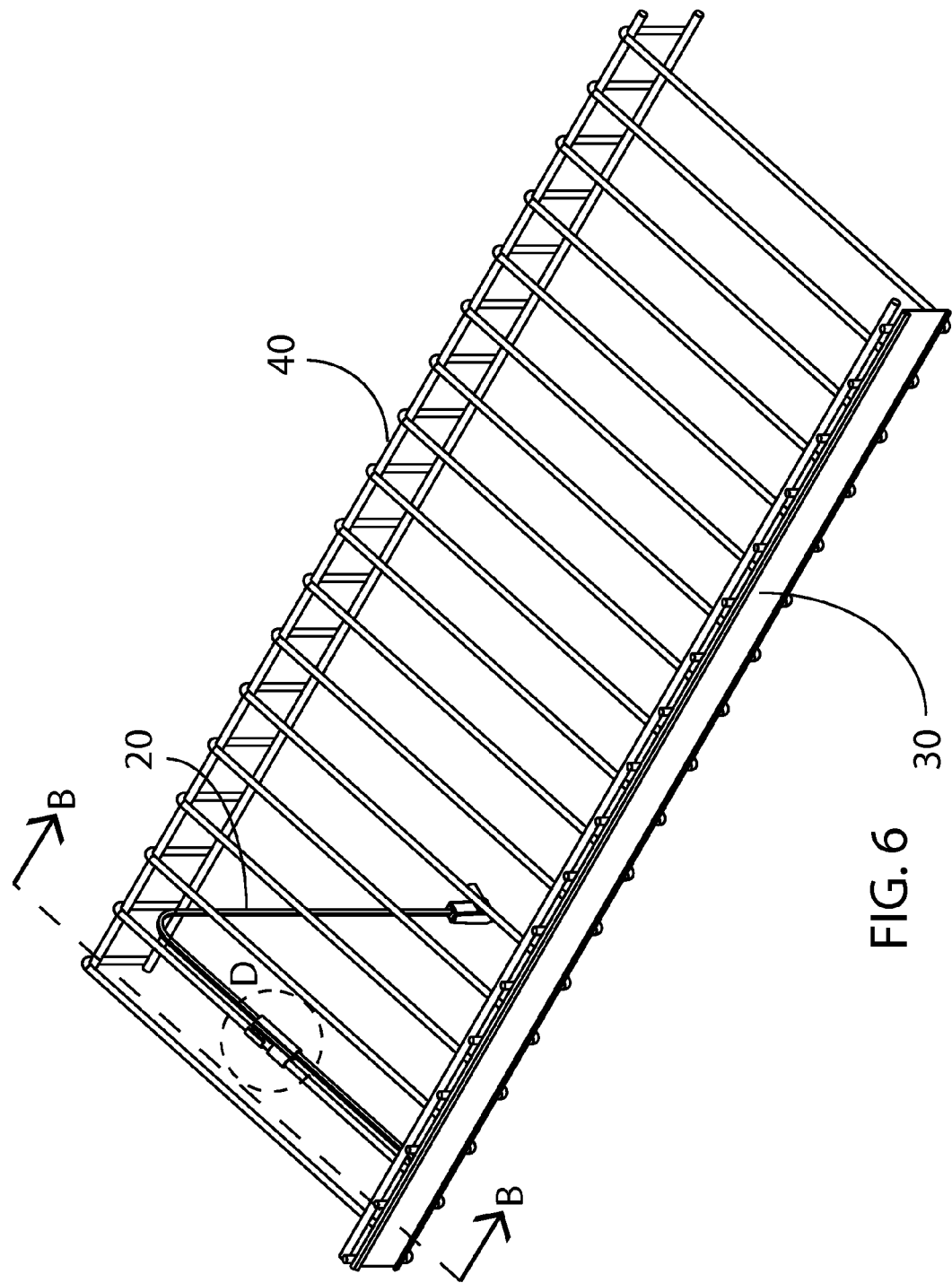
FIG. 6 is a perspective view of a wire merchandizer rack and lighting unit, with a clip of FIG. 1 being used to control the lighting unit's cord, after installation.
Figure 7:
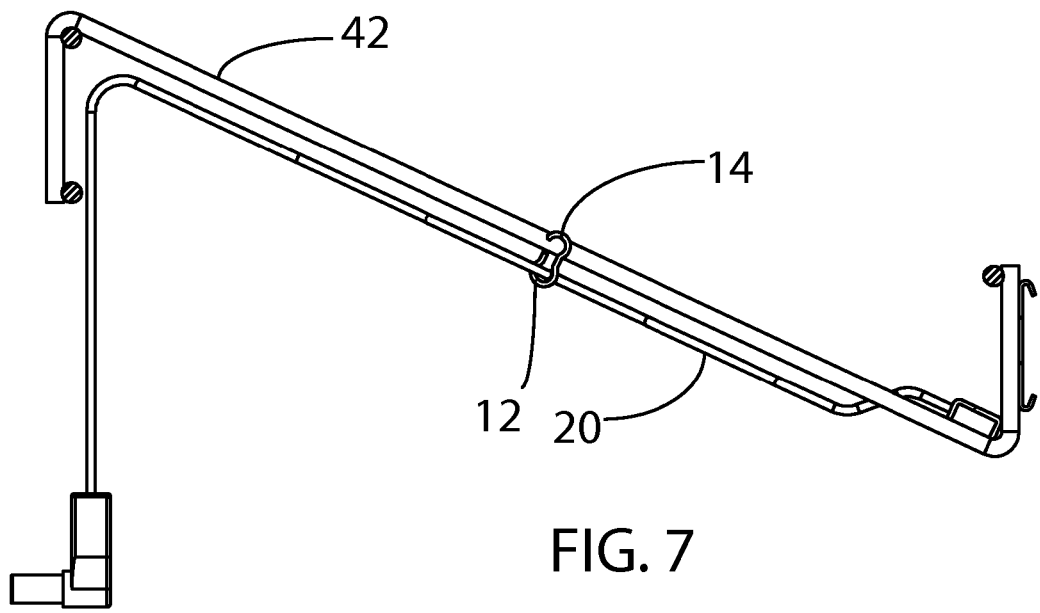
FIG. 7 is a sectional view of the assemblage of FIG. 5, taken along line A-A.
Figure 8:
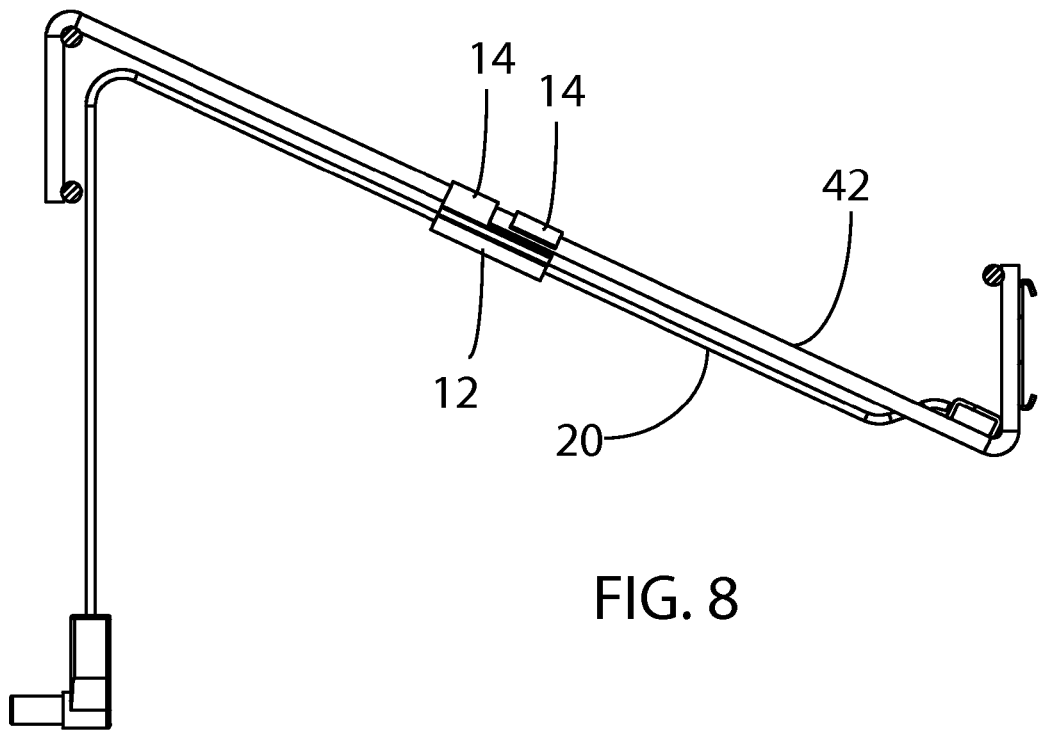
FIG. 8 is a sectional view of the assemblage of FIG. 6, taken along line B-B.
Figure 9:
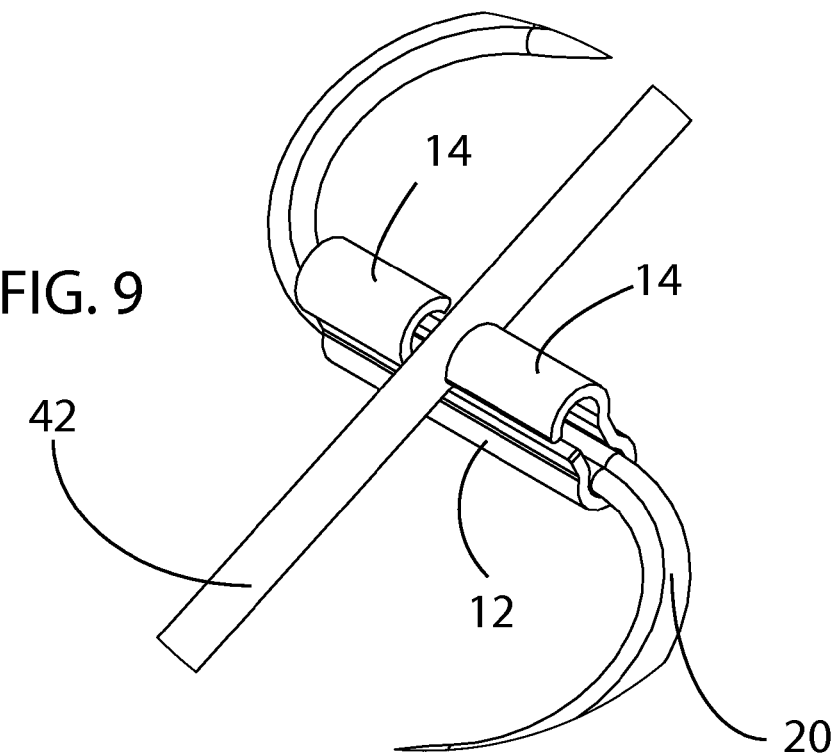
FIG. 9 is a close-up view of the clip and cord of FIG. 5, taken in circle C.
Figure 10:
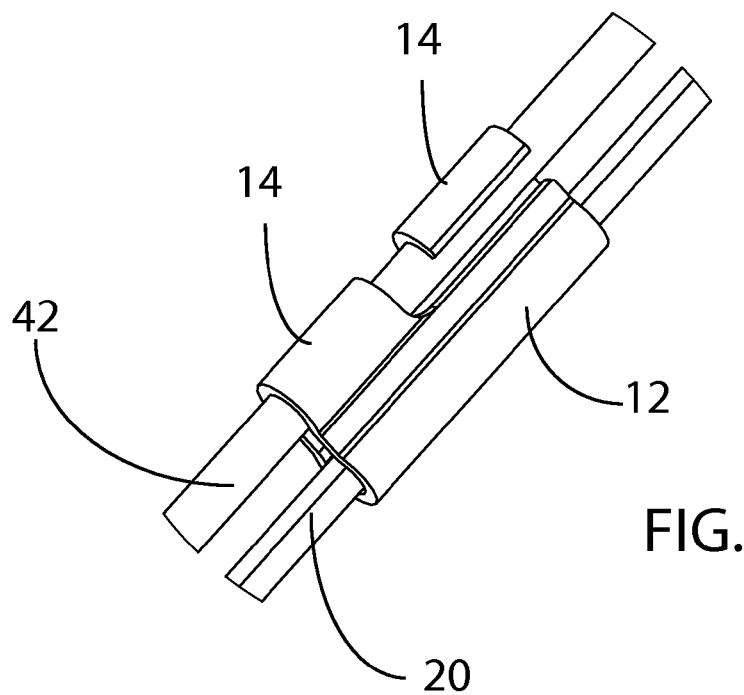
FIG. 10 is a close-up view of the clip and cord of FIG. 6, taken in circle D.

With reference to FIGS. 1-4, the clip 10 is, in and of itself, a simple construction. Clip 10 features a containment sleeve 12, which is a partial cylinder with side (a section of its circumference) open so as to allow a cord 20 (FIGS. 5-10) to pass through the resultant opening 16 into the sleeve and reside within. Two opposing flanges 14 extend from opposite edges of the open side and curve in opposite directions, such that both will extend over the opening 16. Each flange 14 maintains a curvature sufficient to surround one side of a wire 42 in a merchandiser rack 40. The flanges 14 are also to be spaced apart l along a length of the containment sleeve such that a wire 42 of a given gauge may fit in a gap between the flanges 14 and be securely held therebetween.

In use then (FIGS. 5-10) a cord 20 is slipped between the flanges 14 and through the opening 16 in the sleeve 12 so that the cord 20 is securely held along its length by the sleeve 12. The clip 20 is then positioned against a wire 42 of a merchandiser rack 40 such that the wire 42 runs between the flanges 14 and the clip 10 (and associated cord 20) is roughly perpendicular to the wire 42. Then, the clip 10 is twisted into alignment with the wire 42 so that the opposing flanges 14 grasp the wire 42 and hold the clip 10 and associated cord 20 parallel with the wire 42. This arrangement then uses the wire of the merchandiser to camouflage and hide the cord, usually underneath the wire itself. Removal is simply accomplished by twisting the clip 10 in the opposite direction such that the flanges 14 release the wire 42.

The invention has been described in the context of managing the cord 20 of a lighting unit 30 positioned upon a merchandizer 40. It should, however, be readily apparent that its use may be in any context wherein similar structure (i.e. a wire) is available for the attachment of a clip and associated cord. Therefore, the term "merchandiser," as used in this specification, should be seen as including any structure of similar wire construction. As such, the clips 10 may be manufactured for any gauge of cord and any gauge of wire in any combination. The preferred material is a rigid plastic or other polymer as such materials are plentiful, easily engineered for durability, rigidity, and resiliency, are inherent insulators, and are relatively inexpensive to manufacture. Other suitable materials could include metals and composites.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A cord management clip comprising:
   a. a hollow cylindrical containment sleeve defining a circumference, a length terminating at first and second ends, and a volume, with an opening along its entire length in its circumference, said opening in the circumference defining two opposed edges of the containment sleeve and providing access into the volume within the containment sleeve;
   b. two opposing flanges, each extending from one of the opposed edges of the containment sleeve with one flange located proximate the first end of the containment sleeve and one flange located proximate the second end of the containment sleeve, both flanges curving in a manner to extend over the slit opening and defining two structure gripping arms located above and discrete from the containment sleeve;
   c. the opposing flanges each having a length less than half the length of the containment sleeve, such that an orthogonal gap is defined in a region between the flanges, said gap not extending into the cylindrical containment sleeve;

wherein a cord may first be passed through the opening and into the volume of the containment sleeve and then wire may be positioned in the gap between the flanges at an orthogonal relationship to the containment sleeve and the cord management clip is then twisted so that the containment sleeve may be brought into a parallel relationship with the wire while the flanges interact with said wire to secure the clip to the wire.

* * * * *